INTEGRITY CHECK EQUIPMENT FOR AUTOMATIC TRUNK SUBSTITUTION

Filed Dec. 30, 1971 5 Sheets-Sheet 1

INTEGRITY CHECK EQUIPMENT FOR AUTOMATIC TRUNK SUBSTITUTION 3,718,781

INTEGRITY CHECK EQUIPMENT FOR AUTOMATIC TRUNK SUBSTITUTION

Ronald Joseph Angner, Freehold, and Phillip Paul Daniele, Oceanport, N.J., assignors to Bell Telephone Laboratories, Incorporated, Murray Hill, N.J.

Filed Dec. 30, 1971, Ser. No. 214,140
Int. Cl. H04b 3/46
U.S. Cl. 179—175.3 14 Claims

ABSTRACT OF THE DISCLOSURE

This specification discloses equipment for checking the integrity of trunk substitutions accomplished by circuitry which automatically tests trunks for defects that impair communications and then automatically substitutes a spare trunk for a defective trunk. The equipment includes check circuits for trunk substitution acknowledgment signals, coded multidigit trunk substitution control signals and further includes automatic test circuits for reattempting trunk substitution when an acknowledgement signal is not received to indicate a valid substitution. Circuitry is also disclosed for automatically indicating a trouble as a result of the automatic test procedures.

FIELD OF THE INVENTION

This invention relates to automatic trunk testing and substitution equipment and particularly to equipment for automatically checking the integrity of trunk substitution equipment.

BACKGROUND OF THE INVENTION

Automatic trunk testing and substitution arrangements are currently available for checking the integrity of dedicated trunks. One such arrangement is disclosed in a patent application of R. H. Bidlack, W. J. McKelvey, and J. A. Rezelman, U.S. Ser. No. 214,139, filed concurrently herewith. This automatic arrangement transmits periodic inband test signals in both directions over main and spare dedicated trunks between an FAA control center and a remote site to check the integrity of those trunks. A trouble which affects communications over the main trunk results in an interruption in the test signal transmission and causes a substitution of the spare trunk for the main trunk at the control center end of the trunks. Thereafter, a transfer signal is sent over the spare trunk to effect the substitution of the spare trunk for the main trunk at the remote site or far end of the trunks. When the latter action has been fully completed, a signal is returned over the spare trunk to acknowledge that the trunk substitution has been completed.

Although such automatic trunk testing and substitution equipment overcomes priorly existing deficiencies of human trouble sensing as well as manual testing and trunk substitution operations, it may sometimes be subjected to faulty operation due to spurious signals on the spare trunk. Specifically, such signals may cause unwarranted trunk substitutions at only one end of the trunks as well as a failure to substitute a working trunk for a defective trunk. Occurrence of either of these situations immediately causes a communications interruption that usually results in prolonged emergency actions affecting a controller and the aircraft pilots.

The latter emergency actions have the disadvantage of requiring further human sensing of the trouble condition as well as manual testing and trunk substitution operations. Thus, it is apparent that a need exists for automatic equipment that checks the integrity of trunk substitution operations.

SUMMARY OF THE INVENTION

The foregoing disadvantages are overcome and needs are fulfilled in accordance with this illustrative embodiment of our invention in which automatic equipment is integrated into the automatic trunk testing and substitution system, in accordance with the Bidlack et al. invention, for checking the integrity of the transfer control operations of that system. Our equipment provides for the automatic indication of trouble conditions associated with potentially defective trunk substitution operations and thereby eliminates the prior art disadvantage of having humanly to detect such troubles.

Our illustrative equipment provides for the integrity checking by first detecting the absence of a signal which is integrated into the system to verify a valid trunk substitution and, thereafter, indicating the presence of a potentially defective substitution. Following the latter action, our equipment automatically reoperates the trunk substitution control equipment in a reattempt to accomplish the trunk substitution. The integrity of substitution operations is further insured by providing for automatic trunk substitiution only in response to coded multidigit transfer control signals. Our equipment also checks the validity of each of the latter signals to ensure that only valid trunk substitution operations occur. Thus, our equipment precludes unwarranted trunk substitutions due to spurious signals and unwarranted trouble indications due to failure to substitute caused by mutilated control signals. In addition, our equipment automatically indicates troubles in the trunk substitution equipment which heretofore were only humanly detectable after prolonged interruptions in communications and manual testing.

To elaborate, continuous inband testing of the main and spare dedicated trunks is performed by the automatic trunk testing and substitution equipment in accordance with the Bidlack et al. invention until a trouble is detected on the main or spare trunk. When a trouble is detected on the main trunk, the automatic equipment substitutes the operable spare trunk for the defective main trunk by switching actions at the near and far end of the trunks. The far end switching operations are controlled by a transfer signal sent over the spare trunk from the near end. Upon completion of the far end switching operations, a signal is returned over the spare trunk to acknowledge that trunk substitution has been completed.

In accordance with our illustrative embodiment, our integrity checking equipment advantageously checks that the acknowledgement signal is received within a prescribed of time after the transmission of the transfer signal.

It is a feature of our invention that our equipment controls the transmission of the transfer signal a second time to effect the retrial of trunk substitution operations at the far end in the event an ackowledgment signal is not received.

Another aspect of our illustrative invention is that signal verification circuitry is provided at the far end of the spare trunk to verify that a valid transfer signal has been received before effecting trunk substitution. The verification circuitry controls an acknowledgement signal generator incident to trunk substitution operations for transmitting an acknowledgment signal over the spare trunk to the near end thereof to indicate the completion of trunk substitution operations. In the absence of the receipt of the acknowledgment signal, a check circuit automatically provides an alarm indication for identifying a valid trouble condition in the trunk substitution equipment.

More specifically, our equipment is primed to check for the receipt of an acknowledgment signal indicating that trunk substitution has occurred at the far end of the trunks within a predetermined time after the transmission of a first transfer signal. In the absence of receipt of the acknowledgment signal, our equipment does not immediately indicate a trouble, but advantageously causes the transfer signal to be transmitted a second time in the event, for example, a flash of lightning caused mutilation of the first transfer signal. It is unlikely that the second transfer signal will be similarly mutilated and trunk substitution should be accomplished and an acknowledgment signal returned over the spare trunk to the near end thereof if the automatic substitution equipment is functioning properly. Thus, our equipment minimizes unwarranted trouble alarms when substitution is not accomplished at the far end of the spare trunk.

At times spurious signals on the spare trunk can be interpreted to be transfer signals by the substitution equipment at the far end of the trunks and trunk substitution is made at the far end. As substitution is made at only the far end of the trunks communications signals carried between a controller console and a remote site over the main trunk are interrupted. We provide equipment which advantageously differentiates between spurious signals and valid transfer signals to prevent unwarranted trunk substitution. To aid in differentiating a valid transfer signal from a spurious signal the transfer signal illustratively consists of a sequence of two voice frequency pulses; each comprising a TOUCH-TONE® digit. At the far end of the spare trunk we provide equipment, in accordance with this embodiment of our invention, which checks the two frequencies that make up the first of the two TOUCH-TONE digits and then checks the time duration of the first digit. If the first digit meets these reqiured criteria the equipment is enabled for a prescribed period of time to check the two frequencies that make up the second TOUCH-TONE digit, and if the proper digit is detected the spare trunk is substituted for the main trunk. The time duration of the first TOUCH-TONE signal pulse must exceed a predetermined period of time which is greater than that normally experienced for spurious signals found on the space trunk. As the possibility of finding the proper two frequencies concurrently present on the spare trunk, each being greater than a prescribed time duration, is remote our equipment effectively precludes having unwarranted trunk substitution at the far end of the trunk.

BRIEF DESCRIPTION OF THE DRAWING

Our invention will become more apparent upon consideration of the following description of a specific exemplary embodiment shown in the drawing in which:

In FIGS. 1 to 4, the equipment has been given alphabetic or numeric designations which are prefixed by a single digit indicating the figure in which the equipment is located. Illustratively, the first 2 in the numerical designation 212 identifies a ramp generator circuit. Those designations, with the prefix 1, given to equipment blocks shown in FIG. 1 are used in FIG. 2 through 4 to identify the corresponding equipment blocks in the schematic diagram.

Figure 1:
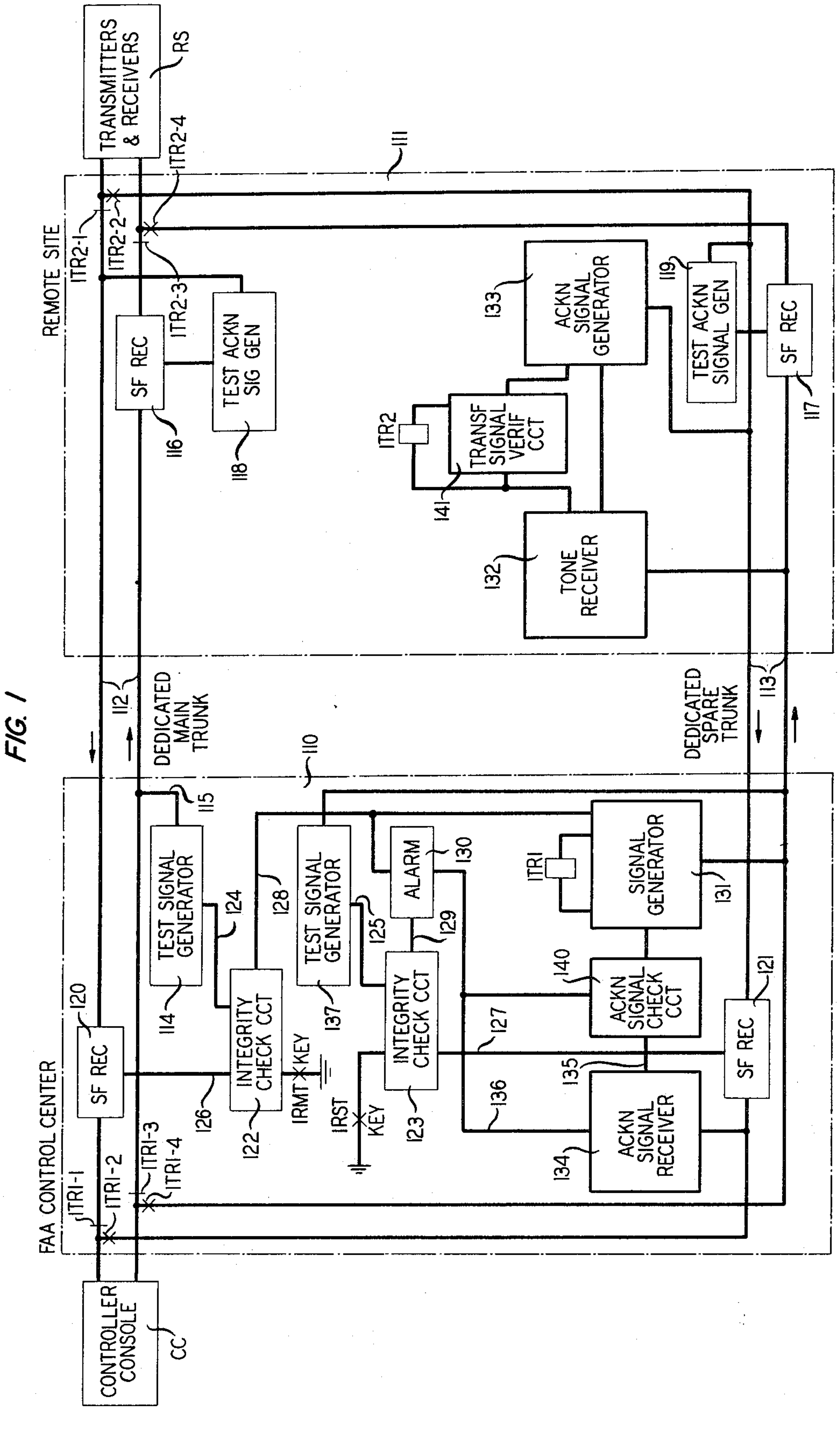
FIG. 1 is a block diagram showing the interrelationship of the various components of an illustrative FAA system having automatic equipment for testing and substitution of dedicated trunks and equipment checking the integrity of trunk substitution operations.

The drawing shows only those details which are necessary for complete understanding of our invention. Other equipment elements are shown only in block diagram form inasmuch as the details thereof form no part of our invention. Illustratively, the signal frequency receivers 120 and 121 may be of a design disclosed in U.S. Pat. 2,642,500 issued June 16, 1953 to W. W. Fritschi et al., and also described in the Bell System Technical Journal, "Inband Single Frequency Signaling," vol. 33, 1954.

GENERAL DESCRIPTION

Referring now to FIG. 1, there is shown a general block diagram of an FAA system equipped with automatic inband trunk testing and trunk substitution equipment 110 and 111 and including acknowledgment signal check circuit 140 and transfer signal verification circuit 141 in accordance with our invention. Main trunk 112 is a dedicated 4-wire trunk over which voice frequency communications are carried between a near end controller console CC and a remote site RS while a spare 4-wire trunk 113 is connected to be an alternate communication path when equipment 110 and 111 detect trouble in main trunk 112. Equipment 110 at the near end of trunks 112 and 113 performs near end testing and the substitution of trunk 113 for trunk 112. Equipment 111 at the far end of trunks 112 and 113 acts in response to signals from the controlling equipment 110 to perform far end testing and trunk substitution.

Test signal generators 114 and 137 in equipment 110 concurrently generate periodic inband 2400 Hz. test pulses on leads 115 and 138 for transmission over trunks 112 and 113. At equipment 111, single frequency (SF) receivers 116 and 117 detect each 2400 Hz. test pulse and cause test acknowledgment signal generators 118 and 119 to return a 2600 Hz. acknowledgment signal over trunks 112 and 113 respectively. At equipment 110, the acknowledgment signals are detected by SF receivers 120 and 121 for checking the integrity of trunks 112 and 113 as described hereinafter.

SF receivers 116, 117, 120 and 121 each filter the respective 2400 Hz. or 2600 Hz. pulses from the transmission paths to prevent interference with voice frequency communications that pass therethrough. The use of different frequencies for the test and acknowledgment signals prevents an undesired short or shunt transmission path between the transmit and receive paths of trunk 112 or 113 from returning the test signal to equipment 110 at the near end and having it interpreted as an acknowledgment signal.

Concurrent with the generation of test signals, generators 114 and 137 each provide a 200-millisecond pulse over leads 124 and 125 to a respective one of the integrity check circuits 122 and 123. Integrity check circuits 122 and 123 each have a counter (not shown) primed to be incremented by the pulse on leads 124 and 125. The incrementation is blocked, however, in response to the receipt of the acknowledgment signals from trunks 112 and 113. The acknowledgment signals activate SF receivers 120 and 121 to apply signals over leads 126 and 127 to block incrementation of the counters in check circuits 122 and 123. When trouble arises with signal transmission over either trunk 112 or 113 which prevents a reception of the acknowledgment signal, the counter in the appropriate one of the circuits 122 or 123 associated with the defective trunk is incremented to the count of one. Following the generation of a second test signal with no acknowledgment signal being received over the defective trunk, the counter in the particular circuit 122 or 123 is incremented to the count of two for causing an output on the respective output lead 128 or 129. The output on lead 128 or 129 energizes common alarm circuit 130 to alert maintenance personnel of defective trunk. In the event trunk 113 is defective, normal communication and testing continue on trunk 112. When trunk 112 is found to be defective, testing continues on trunk 113 and automatic trunk substitution is initiated under control of signal generator 131 and in response to the alarm signal on lead 128.

To accomplished automatic transfer of the communication path from trunk 112 to trunk 113 at the control center end, generator 131 operates a switching relay 1TR1 of which break contacts 1TR1–1 and 1TR1–3 open the communication path at the near end of trunk 112 and make contacts 1TR1–2 and 1TR1–4 transfer the communication path to trunk 113. In addition, generator 131 transmits a coded inband transfer request signal over trunk 113 to equipment 111 where it is detected by tone receiver 132.

In accordance with one aspect of our invention transfer signal verification circuit 141 checks the transfer request signal received by receiver 132 and operates relay 1TR2 if it is determined that the transfer signal is valid. Also in accordance with this illustrative embodiment of our invention the transfer request signal consists of a sequence of two TOUCH-TONE signals, each signal being of a specified time duration.

The operation of relay 1TR2 causes its break contacts 1TR2–1 and 1TR2–3 to open the communication path toward trunk 112 and make contacts 1TR2–2 and 1TR2–4 transfer the communication path to trunk 133. Operated relay 1TR2 also causes receiver 132 to energize acknowledgment signal generator 133 to return a transfer acknowledgment signal over trunk 113 to equipment 110 where it is received by acknowledgment signal receiver 134. Thereafter, communications are carried over trunk 113 until the defect in trunk 112 is cleared and the system is manually restored to normal.

In accordance with another aspect of our invention we advantageously include acknowledgment signal check circuit 140 for effecting the retransmission of the trunk transfer signal over trunk 113 in the event the transfer acknowledgment signal is not received by receiver 134 of equipment 110 within a prescribed period time after transmission of the initial transfer signal. Alarm circuit 130 is energized by check circuit 140 in the event a transfer acknowledgment signal is not received in response to the second transfer signal to alert the maintenance personnel of a failure to transfer.

After the trouble on trunk 112 is clear, key 1RMT is operated by maintenance personnel to effect the release of alarm circuit 130 and a resubstitution of trunk 112 for trunk 113. The operation of key 1RMT clears the counter in check circuit 122 to remove the trouble signal from lead 128 that energized alarm circuit 130. The removal of the trouble signal from lead 128 also results in generator 131 releasing relay 1TR1 and the transmission of a restore signal over trunk 113 to receiver 132 of equipment 111. Receiver 132 responds to the restore signal by releasing relay 1TR2 and energizing generator 133 which returns a restore acknowledgment signal over trunk 113 to receiver 134 of equipment 110. With relays 1TR1 and 1TR2 released, the communication path is transferred via break contacts 1TR1–1 and 1TR1–3 and 1TR2–1 and 1TR2–3 back to trunk 112. If the restore acknowledgment signal is not received, receiver 134 energizes lead 136 to operate alarm circuit 130 for alerting maintenance personnel of a failure to transfer the communication path back to trunk 112.

DETAILED DESCRIPTION

Periodic testing of idle and busy trunks

Figure 2:
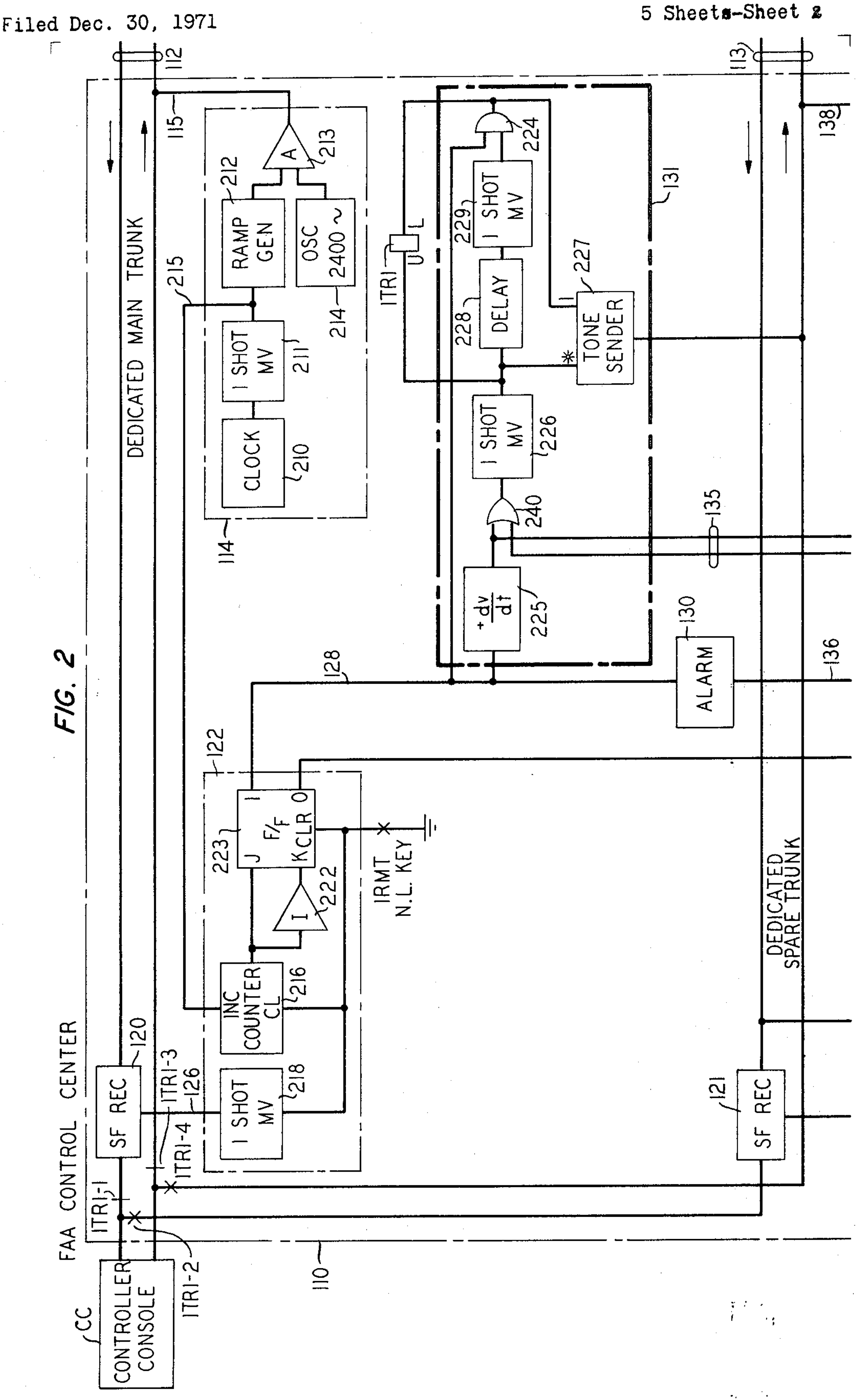
FIGS. 2 and 4 are schematic diagrams of the automatic testing and trunk substitution equipment including an acknowledgment signal check circuit at a near end FAA control center.
Figure 3:
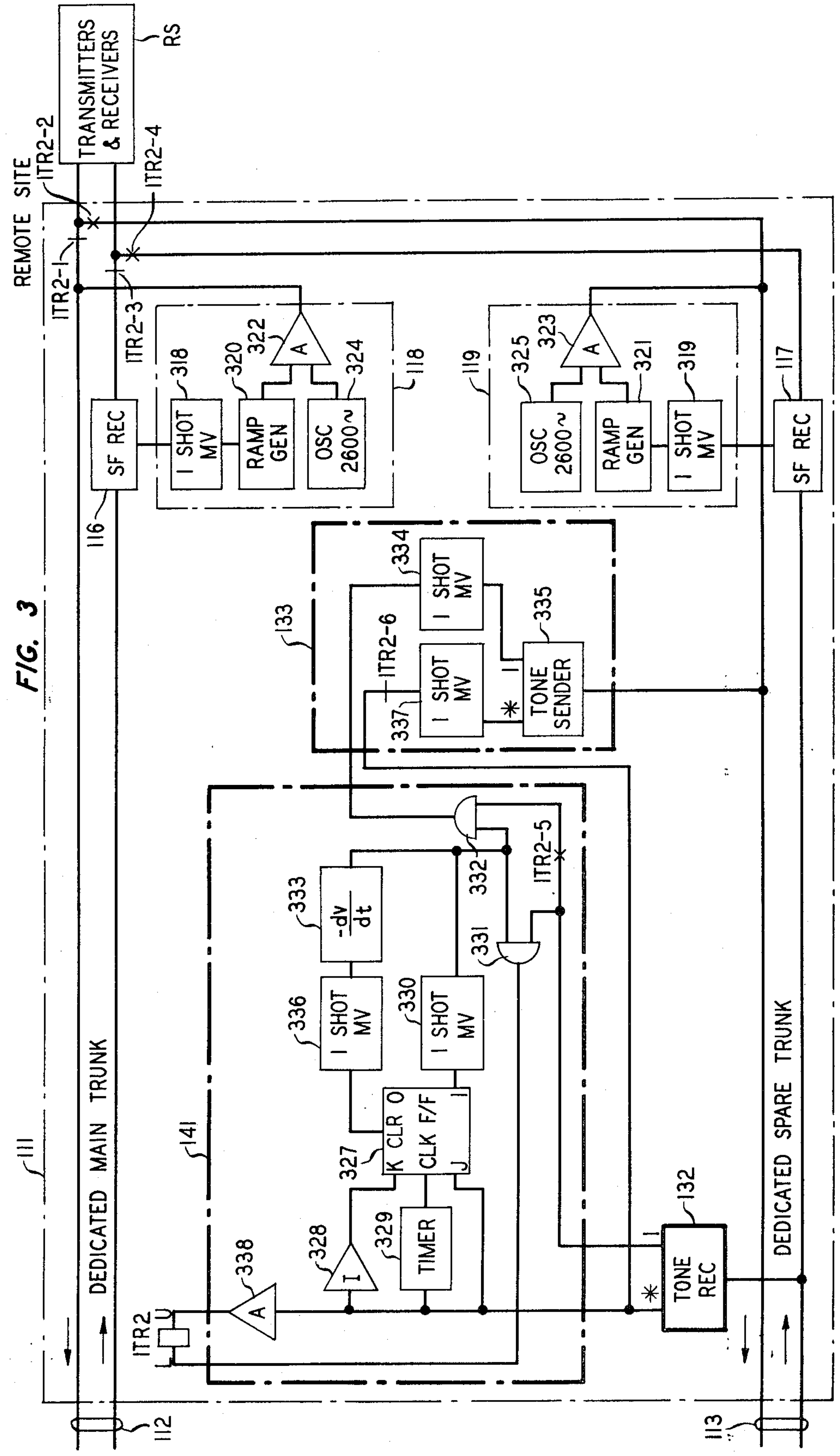
FIG. 3 is a schematic diagram of the automatic testing and trunk substitution equipment including a transfer signal verification circuit at a far end or remote FAA transmitter and receiver site.
Figure 4:
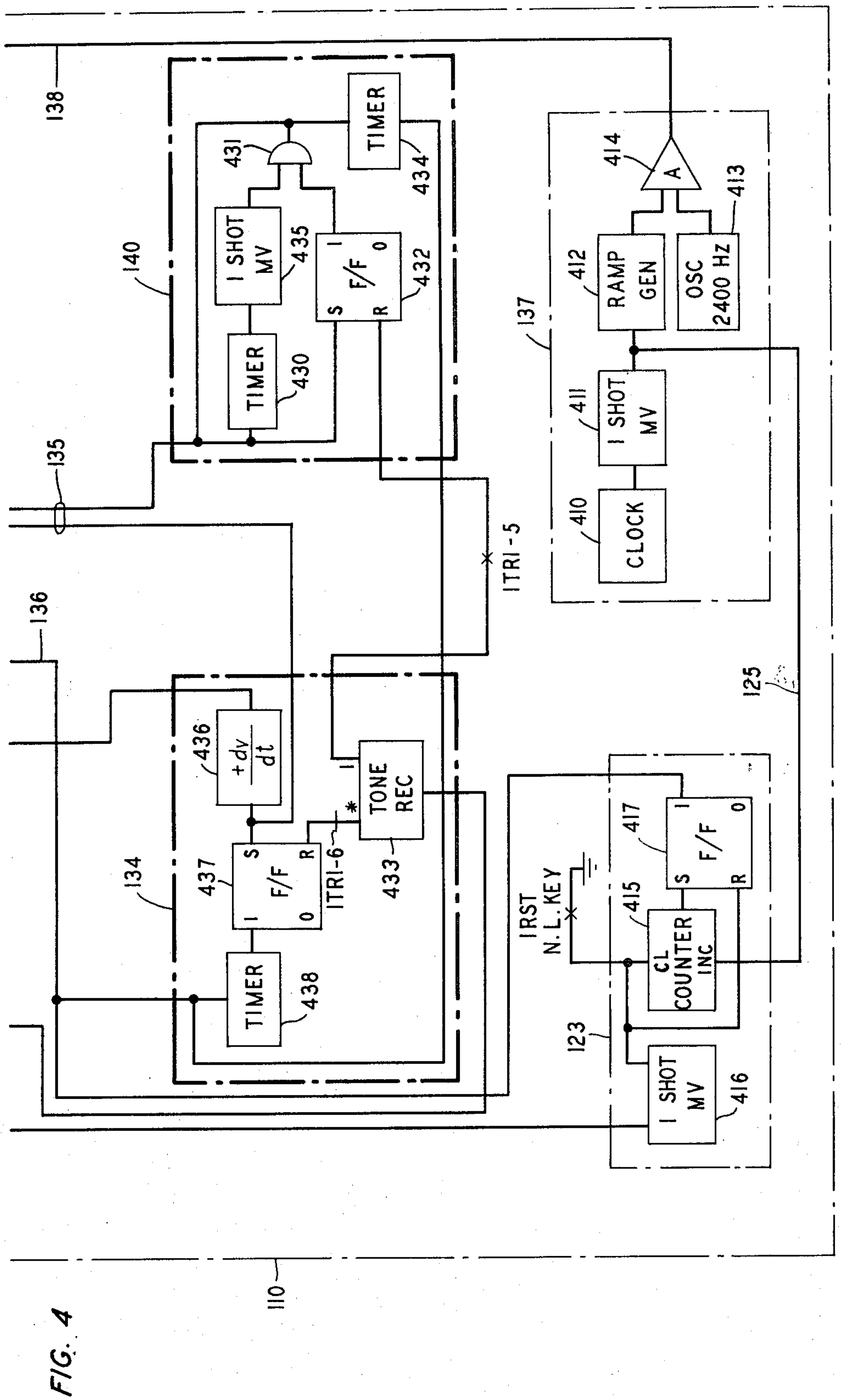
Figure 5:
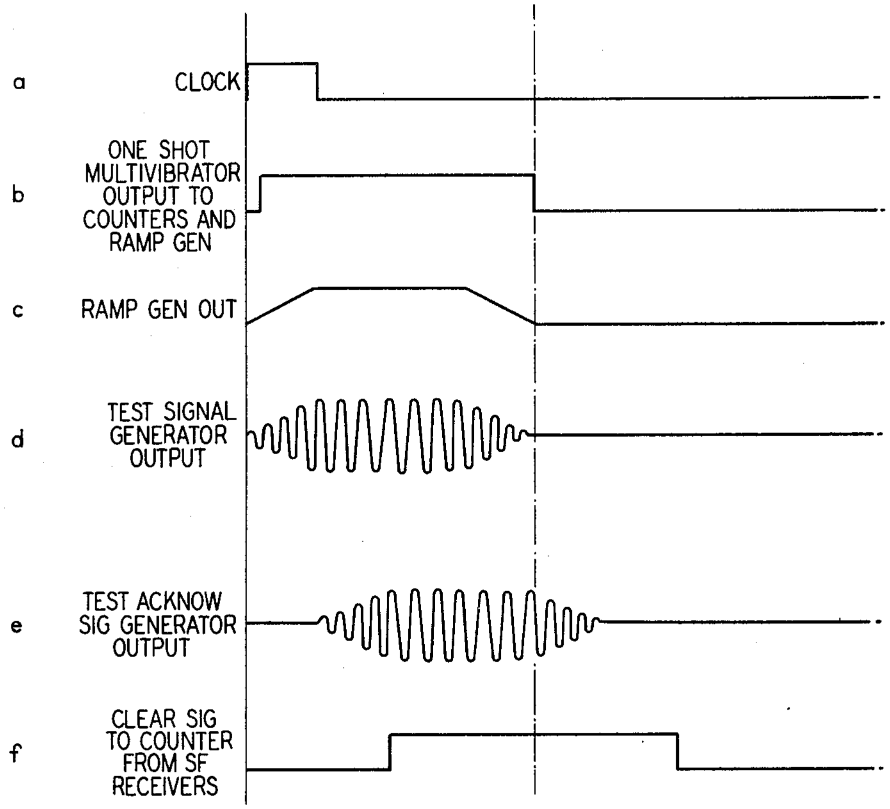
FIG. 5 is a diagram showing illustrative waveforms at strategic locations in the exemplary embodiment of our invention.
Figure 6:
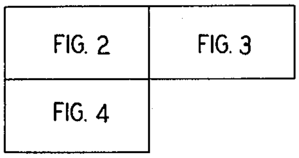
FIG. 6 shows the manner in which the other figures should be arranged to simplify tracing circuits.

Referring now to FIGS. 2, 3 and 4 arranged as shown in FIG. 6, the concurrent testing of trunks 112 and 113 is under the control of clocks 210 and 410 in test signal generators 114 and 137. Every three seconds clock 210 generates a short output pulse (FIG. *5a*) which is converted to a 200-millisecond pulse (FIG. *5b*) by one-shot multivibrator 211. The latter pulse is applied to ramp generator 212 for generating an output as shown in FIG.

*5c*. Amplifier 213 receives the generator 212 output and mixes it with a 2400 Hz. signal from oscillator 214 for producing the 2400 Hz. test signal (FIG. *5d*) for transmission over trunk 112 to equipment 111. The purpose of shaping the envelope of each 2400 Hz. test signal (FIG. *5d*) is gradually to increase the amplitude of leading edge and gradually decrease the trailing edge of each test signal to prevent objectionable or troublesome clicking noises that may otherwise potentially interfere with the voice frequency signals that are carried over trunk 112 or, alternatively, trunk 113.

Clock 410 also generates a pulse as shown in FIG. *5a* every three seconds which causes generator 137 to produce a 200 millisecond test signal of 2400 Hz. tone identical to that produced by generator 114 and the signal is output on lead 138 to be carried over trunk 133 to equipment 111.

The output of multivibrator 211 is also carried on lead 215 to the incrementing input INC of counter 216 in integrity check circuit 122. Similarly, the output of multivibrator 411 is applied to incrementing input INC of counter 415 in check circuit 123. In response to the high to low transition at the end or trailing edge of the 200-millisecond pulse from multivibrators 211 and 411, counters 216 and 415 are incremented to a count of one, unless 2600 Hz. acknowledgment signals are received over trunks 112 and 113 from equipment 111 as later described. Each test acknowledgment signal is arranged to be received over a properly operating trunk within 200 milliseconds from the start of transmission of a test signal. The acknowledgment signal is applied to clearing input CL of the appropriate one of counters 216 and 415 where it blocks incrementation of the counter at the end of the test pulse applied to input INC. This testing cycle continues until a defect occurs in trunk 112 or 113 without interfering with communications carried over trunk 112.

Turning now to equipment 111 (FIG. 3) at the far end of trunks 112 and 113, the 2600 Hz. test signals transmitted over the trunks are detected and filtered from the communication paths by SF receivers 116 and 117, respectively. The voice frequency communications carried over the transmit pair of trunk 112 from the controller console pass through SF receiver 116 and the break contacts 1TR2–3 to reach the remote site. Multivibrator 318 in acknowledgment signal generator 118 responds to the test signal detected by SF receivers 116 to produce a 200 millisecond output pulse. This pulse is applied to ramp generator 320 which generates the output shown in FIG. *5c*. Amplifier 322 receives the output from ramp generator 320 and mixes it with a 2600 Hz. signal from oscillator 324 to produce the 2600 Hz. acknowledgment signal shown in FIG. *5c* for transmission over trunk 112 to equipment 110. Similiarly, generator 119 responds to the signal detected by SF receiver 117 to return an acknowledgment signal over trunk 113.

At the near end of trunks 112 and 113, the 2600 Hz. acknowledgment signals are detected and filtered from the communication paths by SF receivers 120 and 121. Voice frequency communications on trunk 112 from the remote site pass through SF receiver 120 and break contacts 1TR–1 to reach the controller console. Multivibrators 218 and 416 respectively respond to the signals detected by SF receivers 120 and 121 to produce a 200-millisecond output pulse, as shown in FIG. *5f*, which is respectively applied to the clearing inputs CL of counters 216 and 415. It should be noted by comparison of FIG. *5b* and FIG. *5f* that the pulse on clearing input CL of counters 216 and 415 is present when the previously described priming signal to input INC of these counters ends. As a result, counters 216 and 415 are not incremented to the count of one.

The previously described testing sequence is repeated every three seconds to check for a defect in trunk 112 or 113. Upon the occurrence of a defect, the 2600 Hz. test acknowledgment signal is not received by the appropriate one of SF receivers 120 and 121 and clearing input CL of the associated one of counters 216 and 415 is not high due to the presence of an acknowledgment signal when the incrementing input INC goes low at the end of the test signal. As a result, the particular counter is incremented to the count of one; then to a count of two for a second successive missing acknowledgment signal. Upon the incrementation of either counter 216 or 415 to the count of two, check circuit 122 or 123 provides an output which energizes alarm circuit 130 and, in addition, circuit 122 initiates automatic switching operations for trunk substitution if the trouble is in main trunk 112 or its associated testing equipment.

Trouble detected in the spare trunk

The existence of trouble in trunk 113 or its associated testing equipment leaves the communications between the controller console CC and the remote site RS over trunk 112 unaffected and the priorly described testing sequence continues.

Counter 415 is incremented to the count of two as previously described and provides an output to switch flip-flop 417 to its set state when there is a defect in trunk 113. As a result the "1" output of flip-flop 417 is high and energizes alarm circuit 130 to alert maintenance personnel to the trouble. After clearing the trouble in trunk 113, key 1RST of FIG. 4 is operated to apply ground potential to clearing input CL of counter 415 and the reset input of flip-flop 417. This resets counter 415 to zero and causes flip-flop 417 to return its reset state with the "1" output low and alarm circuit 130 is deenergized.

Trouble detected in the main trunk

When trouble arises in trunk 112, the communication path between controller console CC and the remote site RS is disrupted until automatic trunk substitution reestablishes the communication path over trunk 113. Prior to a trouble condition on trunk 112, the output from counter 216 in check circuit 122 is low and accordingly the "J" input to JK flip-flop 223 is low. This output is inverted by inverter 222 to keep the "K" input of flip-flop 223 high. Accordingly, flip-flop 223 is in its "0" state with its "0" output high and its "1" output low.

A trouble condition in trunk 112 results in counter 216 being incremented to the count of two, as previously described, and the output of the counter is high. In response thereto, the "J" input of flip-flop 223 is high and its "1" output is high. Correspondingly, the "K" input and the "0" output of flip-flop 223 is low. The high "1" output of flip-flop 223 energizes alarm circuit 130 to alert maintenance personnel of the trouble on trunk 112 and initiates automatic substitution of trunk 113 for trunk 112.

To accomplish automatic trunk substitution, signal generator 131 is activated by flip-flop 223 to operate relay 1TR1 of FIG. 2 and to transmit a transfer signal over trunk 113. The trunk transfer signal is a sequence of two TOUCH-TONE signals, each signal being of a specified time duration, to prevent spurious frequencies appearing on trunk 113 from causing unwarranted trunk transfers at equipment 111.

The high "1" output or flip-flop 223 is applied to one of the two inputs of AND gate 224 and to $+dv/dt$ ciruit 225 which responds to the low to high transition of the "1" output of the flip-flop and generates a short pulse. The latter pulse passes through OR gate 240 to trigger one-shot multivibrator 226 which generates a 200-millisecond pulse at the "*" input of tone sender 227 for, in turn, causing a 200-millisecond pulse of the first of the two TOUCH-TONE signals to be transmitted over trunk 113.

To generate the second TOUCH-TONE signal, the output of multivibrator 226 is delayed for 250 milliseconds by delay circuit 228, the output of which then energizes one-shot multivibrator 229 to generate a second 200-millisecond pulse 50 milliseconds after the end of the first pulse. The output of multivibrator 229 energizes a second input of AND gate 224 for 200 milliseconds. With both inputs of AND gate 224 energized the output is high and energizes the "1" input of sender 227. As a result, a 200-millisecond pulse of the second TOUCH-TONE digit is transmitted over trunk 113.

The output of AND gate 224 also energizes winding L of latching relay 1TR1 to switch it from its unlatched state to its latched state. Break contacts 1TR1–1 and 1TR1–3 disconnect controller console CC from trunk 112 while make contacts 1TR1–2 and 1TR1–4 connect console CC to trunk 113.

Acknowledgment signal check

While the transfer signal is being generated by generator 131, the pulse output from $+dv/dt$ circuit 225 starts timer 430 in acknowledgment signal check circuit 140. Once started, timer 430 completes a timing cycle of 500 milliseconds and then generates a puse which energizes one-shot multivibrator 435 to produce a two-second pulse which is applied to one of two inputs of AND gate 431. The other input of AND gate 431 is connected to the "1" output of flip-flop 432 which is initially in its reset or "0" state. The pulse that starts timer 430 also places flip-flop 432 in its set state making its "1" output high and, accordingly, the second input of AND gate 431 high. If a transfer acknowledgement signal is received over trunk 113 from equipment 111, as described hereinafter, flip-flop 432 is returned to its reset state before the end of the timing period of timer 430 and both inputs of AND gate 431 are not high at the same time. In the event an acknowledgement signal is not received, flip-flop 432 is not reset and when multivibrator 435 operates both inputs to AND gate 431 are high. The output of gate 431 is high for two seconds and causes retransmission of the transfer signal as described further in the specification.

Trunk transfer at the far end of the trunks and acknowledgment signal generation When there are no defects in equipment 110 and 111, the transfer signal transmitted over trunk 113 is received by tone receiver 132 and is checked by transfer signal verification circuit 141 which operates relay 1TR2 upon determining the transfer signal is valid. Contacts of relay 1TR2 effect the transfer of the communications path from trunk 112 to trunk 113. Thereafter, verification circuit 141 energizes acknowledgment signal generator 133 to return a transfer acknowledgment signal over trunk 113 to equipment 110.

In FIG. 3, tone receiver 132 receives the coded transfer signal and generates a DC pulse output on its "*" output lead followed by a DC pulse output on its "1" output lead. Receiver 132 provides initial screening of valid transfer signals from spurious signals because each TOUCH-TONE digit of the transfer signal consists of two frequencies and the proper two frequencies must be concurrently present on trunk 113 to obtain an output from receiver 132. Both digit pulses are checked by verification circuit 141 to determine if a valid transfer signal has been received. The first pulse makes the J input of flip-flop 327 high while inverter 328 makes the K input low. Flip-flop 327, which is initially in its "0" state, does not immediately go to its "1" state, however, due to 125-millisecond timer 329 connected to clock input CLK of the flip-flop. Timer 329 is started and continues its timing function only so long as its input is held high. Only when timer 329 times out does it energize input CLK of flip-flop 327. As input CLK of flip-flop 327 must be high while either the J or K input is high in order to place the flip-flop in its "1" or "0" state, the 125-millisecond timing period of timer 329 advantageously prevents the operation of flip-flop 327 by spurious signals on trunk 113.

In response to a valid transfer signal, the "*" and "1" pulse outputs of tone receiver 132 are sequentially high for a period in excess of 175 milliseconds and this is sufficient time for timer 329 to time out and make input CLK of flip-flop 327 high while its J input is also high.

This results in flip-flop 327 being placed in its "1" state. The "1" output of flip-flop 327 energizes one-shot multivibrator 330 which provides a 300-millisecond pulse to one of the two inputs of AND gates 331 and 332. During this 300-millisecond period the two frequencies which comprise the proper second TOUCH-TONE digit of the transfer signal must be present on trunk 113 to effect trunk substitution. The 300 millisecond pulse is also applied to *—dv/dt* circuit 333 which responds to the high-to-low transition at the end of the pulse to generate a pulse used to clear flip-flop 327.

The "1" output of receiver 326 goes high in response to the second TOUCH-TONE digit of the transfer signal and makes the second input of AND gate 331 high. With both inputs high, the output of AND gate 331 is high and energizes terminal L of latching relay 1TR2 to place the relay in its latched state. Contacts of relay 1TR2 perform two functions. First, break contacts 1TR2–1 and 1TR2–3 disconnect the remote site from trunk 112 while make contacts 1TR2–2 and 1TR2–4 connect the remote site to spare trunk 113. Second, break contact 1TR2–5 connects the high "1" output of tone receiver 326 to the second input of AND gate 332. With both inputs of AND gate 332 high, its output is high and energizes one-shot multivibrator 334 to produce a 200-millisecond pulse. The latter pulse energizes the "1" input of tone sender 335 which transmits a 200-millisecond pulse of the TOUCH-TONE digit "1" over trunk 113 to equipment 110 for acknowledging that communication path transfer has been completed at equipment 111.

The 300-millisecond pulse from multivibrator 330 ends after multivibrator 334 has been energized and the positive to negative transition of its trailing edge is detected by *—dv/dt* circuit 333 which generates a pulse at clearing input CLR of flip-flop 327 to return the flip-flop to its "0" state to await the receipt of another trunk transfer signal.

Receipt of transfer acknowledgment signal

Returning now to FIGS. 2 and 4, tone receiver 433 is responsive to a received transfer acknowledgment signal returned over trunk 113 for generating a DC pulse on its "1" output for passage through the now closed make contact 1TR1–5 to acknowledgment signal check circuit 140 to reset flip-flop 432 to its "0" state. This occurs before timer 430 times out and, as a result, both inputs of AND gate 431 are not high at the same time. Thus, there is no output and AND gate 431 to trigger a retrial at trunk transfer as is discussed hereinafter.

Trunk transfer retrial

When a transfer acknowledgement signal is not received over trunk 113 from equipment 111 within a predetermined period of time, check circuit 140 causes the transfer signal to be transmitted a second time over trunk 113. Failure of check circuit 140 to receive an acknowledgement signal in response to the second transfer signal causes a trouble signal to be generated to alert the maintenance personnel of a failure to transfer.

Upon failure of receiver 433 in circuit 134 to receive an acknowledgement signal in response to the first transfer signal no output is provided from the receiver through make contact 1TR1–5 to reset flip-flop 432 in check circuit 140. Thus the "1" output of flip-flop 432 remains high and timer 430 times out and energizes multivibrator 435 to make the second input of AND gate 431 high. Both inputs of AND gates 231 are now high. The high output of AND gate 431 is connected through OR gate 240 to multivibrator 226 which produces a 200-millisecond pulse that causes a second transmission of the coded trunk transfer signal in the manner previously described. The high output of AND gate 431 also starts timer 434 which produces a pulse after a timing period within which a transfer acknowledgment signal should be received in response to the second transfer signal. Timer 434 stops its timing function if its input becomes low, in response to an acknowledgment signal before it has timed out.

Equipment 111 at the far end of trunk 113 receives the second transfer signal, attempts trunk substitution, and returns an acknowledgment signal upon successful substitution; all as previously described. Receipt of the acknowledgment signal by circuit 134 results in flip-flop 432 being reset, as previously described, and its "1" output connected to the "1" input of AND gate 431 is low. This in turn causes the output of AND gate 431 to be low which disables timer 434 before it has timed out.

Upon failure to receive an acknowledgment signal on retrial, the "1" output of flip-flop 432 stays high which causes the output of AND gate 431 to remain high for the two second period that multivibrator 435 keeps the other input of the gate high. As a result, the input of timer 434 is held high for two seconds and it times out and generates a pulse to energize alarm circuit 130 which alerts the maintenance personnel that automatic trunk substitution has failed.

Restoral of main dedicated trunk

Once the maintenance personnel have eliminated a trouble in main trunk 112 key 1RMT is operated to effect resubstitution of trunk 112 for trunk 113 and to restore normal testing of trunk 112 by clearing counter 216 associated therewith.

A contact of operated key 1RMT applies ground potential to clearing input CL of counter 216 in check circuit 122 to reset the counter to its "0" state. In addition the ground potential is applied to clearing input CLR of flip-flop 223 to return the flip-flop to its "0" state. As flip-flop 223 changes to its "0" state its "0" output undergoes a low to high transition to which *+dv/dt* circuit 436 responds and generates a pulse. The pulse from circuit 436 is used to effect substitution of trunk 112 for trunk 113 at both the near and far ends of the trunks. To accomplish substitution the pulse from circuit 436 is applied via OR gate 240 to one-shot multivibrator 226 which generates a 200-millisecond pulse in response thereto. The latter pulse energizes the "*" input of tone sender 227 and a 200-millisecond TOUCH-TONE signal pulse is transmitted over trunk 113 to equipment 111 to effect resubstitution at the far end of the trunks. The latter pulse also energizes winding terminal U on latching relay 1TR1 to return relay 1TR1 to its unlatched state to effect resubstitution at the near end of the trunks.

The pulse generated by *+dv/dt* circuit 436 also energizes the "S" input of flip-flop 437 the "1" output of which becomes high and starts timer 438 connected thereto. Timer 438 continues its timing function only as long as its input is held high and when it times out it produces a pulse to energze alarm circuit 130. The timing perod of timer 438 is 500 milliseconds which allows a trunk restoral signal to be transmitted to equipment 111 at the far end of trunk 113, and a restoral acknowledgement signal to be returned to equipment 110. The receipt of the restoral acknowledgement signal by receiver 134 causes flip-flop 437 to return to its "0" state and, as a result, timer 438 is reset before it times out, as described hereinafter.

At equipment 111 the restoral signal is received by tone receiver 132 which generates a DC pulse on its "*" output in response thereto. The pulse output from receiver 132 is used to concurrently release latching relay 1TR2, which effects resubstitution of the far end, and to return a restoral acknowledgment signal over trunk 113 to equipment 110. To release relay 1TR2 the pulse from receiver 132 is amplified by amplifier 338 to energize terminal U on relay 1TR2 which returns to its unlatched state. For the generation of the acknowledgment signal, the pulse from receiver 132 passes through the still closed make contact 1TR2–6 to energize one-shot multivibrator 337 in generator 133. Multivibrator 337 produces a 200-millisecond output pulse which energizes the "*" input of tone sender 335, causing transmission of a 200-millisecond pulse of the appropriate TOUCH-TONE signal over trunk 113 to equipment 110 to acknowledge resubstitution.

The restoral acknowledgment signal returned over trunk 113 is received by tone receiver 433 which generates a DC pulse on its "*" output. This pulse is applied through break contact 1TR1–6 to the reset input of flip-flop 437 which is returned to its reset state where its "1" output is low and timer 438 is stopped. In the event the acknowledgment signal is not received by receiver 433 or relay 1TR1 is not released flip-flop 437 is not returned to its "0" state. The input to timer 438 is held high by the "1" output of flip-flop 437 and the timer completes its timing period and energizes alarm circuit 130 to alert the maintenance personnel to a failure to restore trouble condition.

Upon release of the latching relays at equipment 110 and 111, the communication path between controller console CC and remote site RS is reestablished over main trunk 112 and testing of trunks 112 and 113 takes place as priorly described.

While the equipments of this invention have been described with reference to a particular embodiment, it is to be understood that such an embodiment is intended to be illustrative of the principles of the invention and numerous other arrangements may be devised by those skilled in the art without departing from the spirit and scope of the invention.

What is claimed is:

1. An arrangement for maintaining the integrity of trunk substitutions in automatic trunk testing and substitution equipment comprising:
   - means at or near end of said trunks responsive to a failure to substitute a spare trunk for a defective main trunk at a far end of said trunks for controlling the transmission of a coded transfer signal to said far end to effect a substitution of said spare trunk for said main trunk thereat on a retrial basis,
   - means for checking the validity of said transfer signal received at said far end and effecting said substitution thereat upon determining said transfer signal is valid,
   - means responsive to said substitution for returning a signal to said near end to acknowledge said substitution, and
   - means at said near end responsive to the receipt of said acknowledgement signal thereat for indicating the failure or substitution integrity of said trunk substitution.

2. An arrangement for checking the substitution of an operable spare trunk for a defective main trunk wherein a trunk substitution failure signal is generated in response to a failure to substitute a spare trunk for a defective main trunk, said arrangement comprising:
   - means responsive to said trunk substitution failure signal for controlling the transmission of a prescribed transfer signal to a remote end of said trunks,
   - means at said remote end responsive to a receipt of said transfer signal for effecting a substitution of said spare trunk for said main trunk,
   - means responsive to the substitution of said spare trunk for said main trunk at said remote end for transmitting a signal over said spare trunk to acknowledge the substitution, and
   - means controlled by said acknowledgment signal transmission for indicating the failure or substitution integrity of said trunk substitution.

3. The invention in accordance with claim 2 wherein said transfer signal controlling means includes:
   - means responsive to an initiation of an attempted substitution of said spare trunk for said main trunk for generating a timed interval within which a valid substitution of said spare trunk for said main trunk is to occur, and
   - means energized by said generating means at the end of said timed interval to control said transmission of said transfer signal.

4. The invention in accordance with claim 3 wherein said generating means includes gate circuitry jointly responsive to an expiration of said timed interval and an absence of a prescribed substitution acknowledgment signal for initiating said transmission of said transfer signal.

5. The invention in accordance with claim 4 wherein said gate circuitry includes a gate operable to indicate the absence of receipt of said presrcibed substitution acknowledgment signal, a flip-flop operable for indicating to said gate the absence or presence of receipt of said prescribed substitution acknowledgment signal, and a tone receiver for detecting the presence of said prescribed substitution acknowledgment signal on said spare trunk to control an operation of said flip-flop.

6. The invention in accordance with claim 5 further comprising:
   - means responsive to an initiation of said transfer signal transmission for defining another timed interval within which the integrity of the trunk substitution is checked, the receipt of said acknowledgment signal by said tone receiver operating said flip-flop to control said gate for indicating the integrity of said substitution at the termination of said another timed interval.

7. The invention in accordance with claim 6 further comprising:
   - means operable for transmitting a sequence of two tone signals comprising said transfer signal,
   - means for controlling the operation of said tone signal transmitting means including means for operating said tone signal transmitting means to transmit a first one of said tone signals over said spare trunk, and
   - means responsive a prescribed time after the transmission of said first tone signal for operating said tone signal transmitting means to transmit a second one of said tone signals over said spare trunk.

8. The invention in accordance with claim 7 further comprising:
   - means defining the duration of operation of said tone signal transmitting means for said first tone signal transmission, and means energized after the end of said first tone signal for generating a prescribed delay interval after which said delay interval generating means energizes said tone signal transmitting means to generate said second tone signal.

9. The invention in accordance with claim 8 further comprising:
   - means at said remote end of said trunks for substituting said spare trunk for said main trunk responsive to the receipt of said first and second tone signals thereat.

10. The invention in accordance with claim 9 wherein said substituting means includes:
   - means responsive to the receipt of said first tone signal for conditioning said substituting means to check for the receipt of said second tone signal, and switch means operated upon the successful recepit of said second signal to substitute said spare trunk for said main trunk.

11. The invention in accordance with claim 10 wherein said substituting means includes gate means jointly responsive to said conditioning means indicating the receipt of said first tone signal and the receipt of said second tone signal for operating said switch means to substitute said spare trunk for said main trunk.

12. The invention in accordance with claim 11 wherein said conditioning means includes bistable logic means for indicating to said gate means the absence or presence of receipt of said first tone signal,
   - means for detecting a receipt of said first tone signal, and timer means energized upon the receipt of said first toine signal by said detecting means for defining a timed interval after which said detecting means controls said logic means to indicate the presence of receipt of said first tone signal.

13. The invention in accordance with claim 12 wherein said conditioning means includes means activated by said logic means indicating the presence of receipt of said first tone signal for activating said gate means for a predetermined period of time to operate said switch means upon the receipt of said second tone signal.

14. The invention in accordance with claim 13 further comprising release means responsive to the termination of said timed interval defined by said timer, means for placing said logic element in a state indicating the absence of receipt of said first tone signal to await receipt of another first one signal.

References Cited

UNITED STATES PATENTS

| | | | |
|---|---|---|---|
| 2,680,162 | 6/1954 | Brehm et al. | 179—175.3 |
| 3,364,467 | 1/1968 | Haibt et al. | 179—175.3 |
| 3,364,468 | 1/1968 | Haibt et al. | 179—175.3 |

KATHLEEN H. CLAFFY, Primary Examiner

D. W. OLMS, Assistant Examiner